May 28, 1963　　　　E. J. ROBERTSON　　　　3,091,551
PROCESS OF SPRAYING A POLYETHER-BASED POLYURETHANE FOAM
Filed Nov. 25, 1960　　　　　　　　　　　　　2 Sheets-Sheet 1
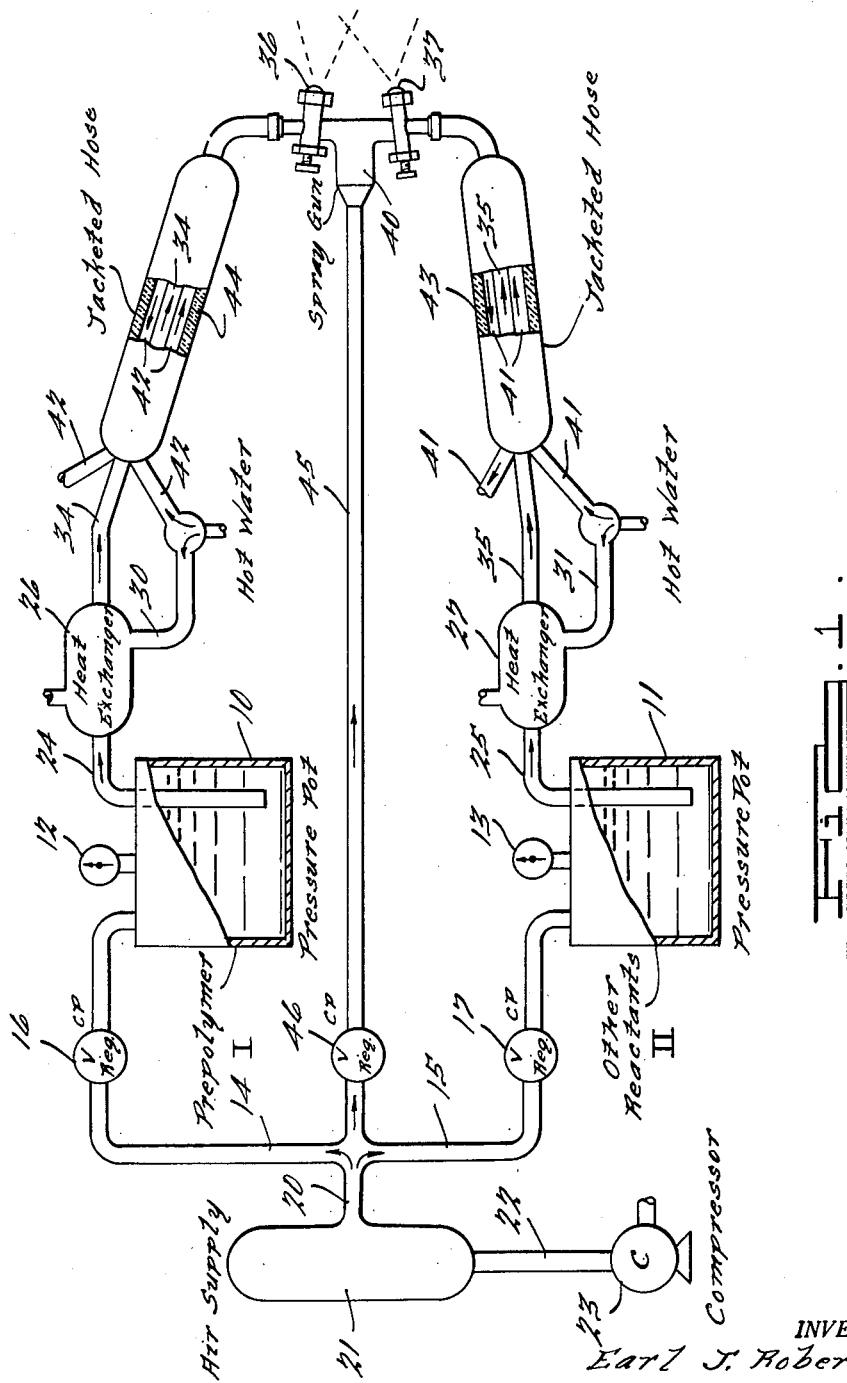
INVENTOR.
Earl J. Robertson
BY
Donald B. Wolff
ATTORNEY May 28, 1963   E. J. ROBERTSON   3,091,551
PROCESS OF SPRAYING A POLYETHER-BASED POLYURETHANE FOAM
Filed Nov. 25, 1960   2 Sheets-Sheet 2
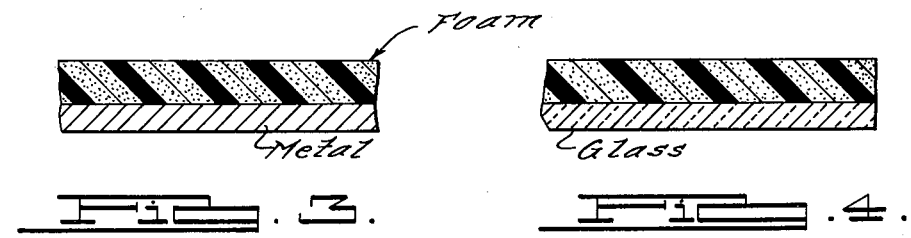
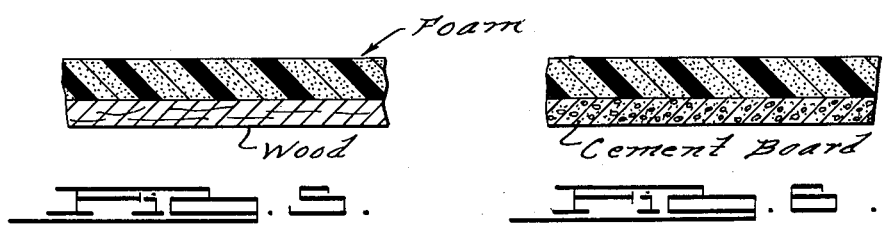
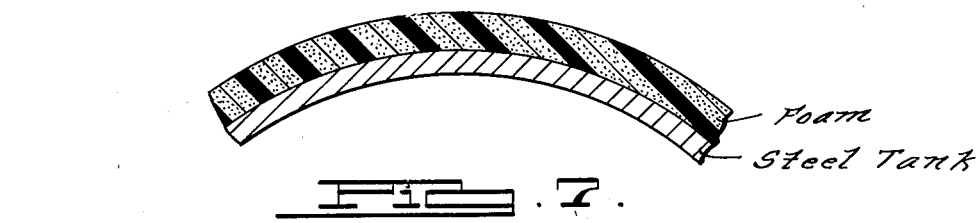
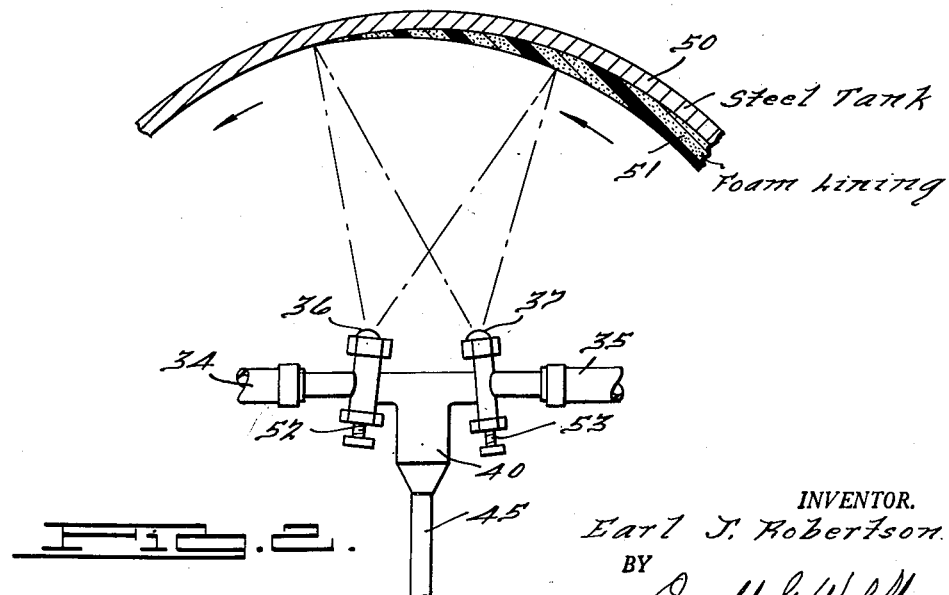
INVENTOR.
Earl J. Robertson
BY Donald G. Wolff
ATTORNEY 3,091,551
PROCESS OF SPRAYING A POLYETHER-BASED POLYURETHANE FOAM
Earl J. Robertson, Trenton, Mich., assignor to Wyandotte Chemicals Corporation, Wyandotte, Mich., a corporation of Michigan
Filed Nov. 25, 1960, Ser. No. 71,826
13 Claims. (Cl. 117—105.5)

This invention relates to improved rigid polyether-based polyurethane foams. In one of its aspects, this invention relates to a method for preparing rigid polyether-based polyurethane foams wherein the foam-forming ingredients are sprayed upon a surface and caused to foam thereon. In still another of its aspects, this invention relates to a composite article of manufacture comprising a base member having an adherent coating of a rigid polyether-based polyurethane foam.

This application is a continuation-in-part of my copending application Serial No. 788,797, filed January 26, 1959, and my copending application Serial No. 841,129, filed September 21, 1959, now abandoned.

While the commercial growth of polyurethane foams has proceeded at a phenomenal rate in the past few years, there is one important area which has lagged far behind its expectations. This area is the use of rigid polyurethane foams for insulation and surface protection, particularly of irregularly shaped objects such as pipes, tanks, valves, and the like. Although polyurethane foams have been tried for these applications they have suffered serious disadvantages such as high cost compared to conventional insulating materials, lack of adequate properties such as aging and weathering characteristics, chemical resistivity, and low thermal insulation efficiency (high K factor), and also difficulty of application. That is, it has been necessary in coating irregularly shaped objects to first build a form or mold around the object into which the foam-forming ingredients are poured and allowed to foam after which the form or mold is removed. In some instances voids or poor adherence of the foam to the object has resulted. In those cases where spraying of the foam-forming ingredients onto the surfaces to be coated has been attempted, not only have the aforementioned difficulties in properties been encountered, but also when working with vertically disposed objects or objects which by necessity require spraying from below, the mixed ingredients have tended to run or drip before the actual foaming begins thus resulting in nonuniformity of the foam layer in the finished articles. Also, these foams have been $CO_2$ blown foams relying upon reaction between excess isocyanate and water to develop the $CO_2$ blowing gas. Further, expensive mixing and spraying equipment have been necessary. In short, rigid polyurethane foams for insulation and surface protection, particularly of irregularly shaped objects, have suffered from the manifest unavailability of a foam formulation meeting the specific requirements of this application.

In accordance with the present invention I have discovered that most, if not all, of the aforementioned difficulties can be substantially overcome by modifying the polyether-based polyurethane foam formulation disclosed and claimed in my copending application Serial No. 788,797, filed January 26, 1959, to include a highly active catalyst, which catalyst will be described in more detail hereinafter, and spraying and impinging the ingredients as an intimate mixture on the surface to be treated. The inclusion of the catalyst causes substantially immediate foaming and adherence of the foam onto the surface treated and results in a foam layer having excellent self-adhesion, a high degree of chemical and weather resistance, and high thermal insulation efficiency (low K factor). Perhaps the most significant advantage of the present invention is the ease and speed of application of foam on either flat or irregular surfaces permitting substantial reductions in labor costs which is generally the most significant economic factor in insulating processes. Using the product and process of the present invention, surfaces can be treated at a rate of about 10 to 20 board feet per minute employing simple commercially available spraying equipment. It is, therefore, an object of the present invention to provide improved rigid polyether-based polyurethane foam compositions.

It is another object of the present invention to provide a method for preparing rigid polyether-based polyurethane foams wherein the foam-forming ingredients are sprayed onto a surface and caused to foam thereon and the foam to adhere thereto.

It is still another object of the present invention to provide a composite article comprising a base member having an adherent coating of a rigid polyether-based polyurethane foam. The accomplishment of the foregoing and additional objects will become more fully apparent hereinafter.

Additional advantages of the presently claimed foam compositions, as well as distinctions over previously known polyurethane foams, are described in detail in my copending application Serial No. 788,797 referred to hereinabove and need not be repeated here. There is also described therein conventional foam-forming methods such as "one-shot," "premix," and "prepolymer" techniques.

It has been found that the objects of the present invention can be accomplished by spraying from one or more orifices: (a) a polyoxyalkylene addition product of a polyhydric alcohol having from 2 to 6 hydroxyl groups inclusive, having a molecular weight between about 270 and 1200 and an equivalent weight between about 90 and 300; (b) a tetra(hydroxyalkyl)alkylene diamine having a molecular weight between about 220 and 400 and an equivalent weight between about 55 and 100; (c) an organic polyisocyanate; (d) a wetting agent; (e) a blowing solvent; and (f) a catalyst selected from the group consisting of triethylene diamine, dibutyltin diacetate, dibutyltin dilaurate, dibutyltin di-2-ethylhexoate, stannous octoate, stannous oleate, and mixtures of the foregoing; and impinging the spray as an intimate mixture upon a common surface whereby substantially immediate foaming and adherence of foam is effected on such common surface, the following further conditions being maintained: (1) overall NCO/OH ratio between about 0.8/1 and 1.2/1; (2) ratio of respective equivalent of (b) to (a) being between about 0.75/1 and 6/1; and (3) average equivalent weight of (a) and (b) combined being between about 80 and 130.

The characteristics of the reactants and reaction ratios are critical for accomplishment of the objects of the present invention and production of high quality rigid polyether-based polyurethane foams, essentially devoid of urea linkages, according to the present invention.

In a "one-shot" procedure, all of the reactants are mixed together at once, as by the use of a multiple stream, multiple orifice nozzle or spray head, or a single orifice internally mixing type of spray gun. In a more conventional "premix" type of "one-shot" procedure, the reactants are divided into two components, the polyisocyanate being separated from the glycol or polyol ingredients until the actual spraying or mixing. In a prepolymer procedure, which is the preferred procedure of the present invention, at least part of the glycol or polyol is reacted with the polyisocyanate according to conventional procedure to form a liquid prepolymer or semi-prepolymer prior to spraying in admixture with the other ingredients, and the remaining polyol, if any, is usually combined with the other ingredients prior to the actual mixing or spraying of the ingredients, usually as two separate intimately mixed streams impinging upon the surface to be treated. However, the wetting agent may be combined with the prepolymer as well as part or all of the blowing solvent. I have found that if a small proportion of unreacted component (a) is included with the blowing solvent apart from the prepolymer a foam having less initial friability is produced. This, however, is an optional procedure. It is also to be pointed out that the tetra(hydroxyalkyl)alkylene diamine having a molecular weight between about 220 and 400 and an equivalent weight between 55 and 100, component (b), should be kept separate from any unreacted polyisocyanate, component (c). The need for this separation arises from the fact that the tetra(hydroxyalkyl)alkylene diamine, component (b), and polyisocyanate, component (c), react almost instantaneously to form a solid mass. With the exception of the above restriction there is no limitation as to other combinations of components.

Whether using a "one-shot," "premix," or "prepolymer" procedure, these reactants are sprayed and impinged as an intimate mixture upon a common surface to be treated whereby substantially immediate foaming and adherence of the foam on the common surface is effected. During the mixing of the reactants, which takes place rather quickly, the temperature of the reaction mixture rises above the boiling point of the blowing solvent, due to the exothermic heat of reaction and the high degree of activity of the catalyst employed, whereby the thus-forming polyurethane rises under pressure of the entrapped gas and, upon setting, produces a rigid polyurethane foam of exceptionally fine texture. External heat may be applied to the surface being treated, but this is rarely necessary. It is more desirable, though not absolutely necessary, to preheat the nonsolvent containing reactants to about 110 to about 130° F. prior to the actual spraying in order to compensate for some loss in temperature due to atomization of the ingredients in the spraying step. If preheating of the reactants prior to spraying is not desirable the quantity of catalyst employed may be increased to effect a speedier foaming reaction rate. This, however, may have some adverse effect on the properties and raise the cost of the foam. It will be appreciated, however, that for best results the conditions inherent in the process, such as temperature, the catalyst proportion, boiling point of the blowing solvent, distance of the spray head from the surface being treated, and the like should be optimized. Given the information presented herein, this should be within the skill of an ordinary worker in this field.

The foams produced in accordance with the present invention may be aged or conditioned for a period, for example, one week at 75° F. and 50% relative humidity, at the end of which time essentially all of their ultimate properties, including adhesion, compressive strength and the like, are attained. Even after extended aging the foams produced according to the present invention will show remarkable retention of their desirable compressive strength, adhesion, and low K factor properties as well as no measurable shrinkage. The superior aging characteristics, especially under conditions of high temperature and humidity, can be attributed mainly to the absence of urea linkages and the absence, or substantial absence, of water in the foaming reaction mixture. As pointed out in my copending application, Serial No. 788,797, foams of excellent appearance and properties are produced in the substantially complete absence of water in the reaction mixture. Reactants containing up to about 0.5% water, which amounts will usually not be present in the combined reactants as sold commercially even if an extra step of vacuum stripping is eliminated, have been found to be operative in the accomplishment of the objectives of this invention. On the other hand, reactants containing a high water content are preferably avoided.

The following discussion relates in greater detail to the reactants and their characteristics, as well as further additional particulars of the invention.

(a) The polyoxyalkylene addition product of a polyhydric alcohol containing from 2 to 6 hydroxyl groups, inclusive, having a molecular weight between about 270 and 1200 and an equivalent weight between about 90 and 300: This reactant may be, for example, polyoxyethylene, polyoxypropylene, polyoxyethylenepolyoxypropylene, polyoxybutylene, or like derivatives of trimethylolpropane, glycerine, hexanetriol, pentaerythritol, sorbitol, dimethylolphenols, triisopropanolamine, tetra(2-hydroxypropyl)ethylene diamine, and the like, so long as the required molecular weight and equivalent weight characteristics are met. Polyoxypropylene glycols of the requisite characteristics may also be used. These products are in general prepared by the addition of alkylene oxides having from 2 to 4 carbon atoms to the starting glycol or polyol. When different types of alkyleneoxy groups are to be present, these products are made by addition of varying alkylene oxides sequentially to the starting glycol or polyol. Polyols, as opposed to glycols, are preferred, as are the derivatives of polyhydric alkanols.

Representative of this reactant are the following:

|  | M.W. | E.W. |
|---|---|---|
| Polyoxyethylene derivative of pentaerythritol | 360 | 90 |
| Polyoxypropylene derivative of pentaerythritol | 400 | 100 |
| Do | 600 | 150 |
| Do | 1,000 | 250 |
| Polyoxyethylene derivative of trimethylolpropane | 270 | 90 |
| Polyoxypropylene derivative of trimethylolpropane | 400 | 133 |
| Do | 750 | 250 |
| Polyoxypropylene derivative of dimethylolphenol | 400 | 133 |
| Polyoxypropylene derivative of glycerol | 400 | 133 |
| Do | 750 | 250 |
| Polyoxypropylene derivative of hexanetriol | 400 | 133 |
| Do | 750 | 250 |
| Polyoxypropylene derivative of sorbitol | 750 | 125 |
| Polyoxyethylene polyoxypropylene derivative of tetra-(2,hydroxypropyl)ethylene diamine | 600 | 150 |
| Do | 900 | 225 |
| Polyoxypropylene derivative of tetra(2-hydroxypropyl)ethylene diamine | 600 | 150 |
| Polyoxypropylene derivative of triisopropanolamine | 425 | 142 |
| Do | 750 | 250 |
| Polyoxypropylene derivative of propylene glycol | 400 | 200 |
| Do | 300 | 150 |
| Polyoxyethylene polyoxypropylene derivative of propylene glycol | 400 | 200 |
| Polyoxybutylene derivative of propylene glycol | 450 | 225 | and numerous other polyoxyalkylene derivatives of polyhydric alcohols having from 2 to 6 hydroxyl groups, inclusive, and the prescribed molecular weight and equivalent weight characteristics. A preferred polymeric polyol is an addition product of propylene oxide and trimethylol propane having an approximate molecular weight of 400 to 450, averaging about 418 and having an average hydroxyl number of 409.

(b) A tetra(hydroxyalkyl)alkylene diamine having a molecular weight between about 220 and 400 and an equivalent weight between about 55 and 100: This reactant may be, for example, alkylene oxide addition products of ethylene, propylene, butylene, amylene and like diamines, for example the ethylene oxide, propylene oxide or butylene oxide addition products thereof, or compounds in which part of the alkylene oxide addition is with one of the named alkylene oxides and the rest with another of the named alkylene oxides. Any of the compounds produced by these variations may be used provided the molecular weight and equivalent weight requirements are met.

Representative compounds are:

|  | M.W. | E.W. |
|---|---|---|
| Tetra(hydroxyethyl)ethylene diamine | 236 | 59 |
| Tetra(hydroxyethyl)propylene diamine | 250 | 62.5 |
| Tetra(hydroxyethyl)butylene diamine | 264 | 66 |
| Tetra(hydroxyethyl)amylene diamine | 278 | 69.5 |
| Tetra(2-hydroxypropyl)ethylene diamine | 292 | 73 |
| Tetra(2-hydroxypropyl)propylene diamine | 306 | 76.5 |
| Tetra(2-hydroxypropyl)butylene diamine | 320 | 80 |
| Tetra(3-hydroxypropyl)ethylene diamine | 292 | 73 |
| Tetra(3-hydroxypropyl)propylene diamine | 306 | 76.5 |
| Tetra(3-hydroxypropyl)butylene diamine | 320 | 80 |
| Tetra(4-hydroxybutyl)ethylene diamine | 348 | 87 |
| Tetra(3-hydroxybutyl)propylene diamine | 362 | 90.5 |
| Tetra(4-hydroxybutyl)butylene diamine | 376 | 94 |
| Tri(hydroxyethyl)mono(2-hydroxypropyl)ethylene diamine | 250 | 62.5 |
| Di(hydroxyethyl)di(2-hydroxypropyl)ethylene diamine | 264 | 66 |
| Mono(hydroxyethyl)tri(2-hydroxypropyl)ethylene diamine | 278 | 69.5 | with N,N,N',N'-tetrakis(2 - hydroxypropyl)ethylene diamine being preferred, and numerous other tetra(hydroxyalkyl)alkylene diamines having the prescribed characteristics.

(c) *Organic polyisocyanate:* Any of a wide variety of organic polyisocyanates (c) may be employed in the reaction, including aromatic, aliphatic and cycloaliphatic diisocyanates and combinations of these types. Representative compounds include aromatic diisocyanates, such as 2,4-tolylene diisocyanate, mixtures thereof with 2,6-tolylene diisocyanate (usually about 80/20), 4,4-methylene-bis(phenylisocyanate), and m-phenylene diisocyanate. Aliphatic compounds such as ethylene diisocyanate, ethylidine diisocyanate, propylene-1,2-diisocyanate, butylene-1,3-diisocyanate, tetramethylene diisocyanate, hexamethylene diisocyanate and decamethylene diisocyanate, and alicyclic compounds such as 1,2- and 1,4-cyclohexylene diisocyanates and 4,4'-methylene-bis(cyclohexylisocyanate) are also operable. Arylene diisocyanates, i.e., those in which each of the two isocyanate groups is attached directly to an aromatic ring, react more rapidly with the polymeric glycols or polyols than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compounds the isocyanate groups may be attached either to the same or to different rings. Dimers of the monomeric diisocyanates and di(isocyanatoaryl)ureas such as di(3-isocyanato-4-methylphenyl)urea may be used. Additional polyisocyanates which may be employed, for example, include: p,p'-diphenylmethane diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 4-chloro-1,3-phenylene diisocyanate, 3,3'-dichloro-4,4'-biphenylene diisocyanate, triphenylmethane triisocyanate, and 1,5-naphthalene diisocyanate, and other polyisocyanates in a blocked or semi-inactive form such as the bis-phenylcarbamates of tolylene diisocyanate, p,p'-diphenylmethane diisocyanate, p-phenylene diisocyanate, and 1,5-naphthalene and 1,5-tetrahydronaphthalene diisocyanates.

(d) *A wetting agent:* A wetting agent or surfactant is necessary for production of high grade polyurethane foam according to the present invention, since in the absence of same the foams have a tendency to collapse or contain very large uneven cells. Numerous wetting agents have been found satisfactory. Nonionic surfactants and wetting agents are preferred. Of these, the nonionic surface active agents prepared by the sequential addition of propylene oxide and then ethylene oxide to propylene glycol such as those comercially available under the trademark Pluronic, and the solid or liquid water-soluble organosilicones, especially those marketed by the Silicone Division of Union Carbide Company, have been found particularly desirable. Other surface active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The quantity of surfactant or wetting agent in the reaction mixture is also of significance, although this will vary somewhat depending upon the efficiency of the wetting agent. Generally, from about .05 to about 2.0% of surfactant by weight to total reactants is adequate. Below the lower amounts, the foams have a tendency toward large and uneven cell structure, while more than about 2.0% does not improve foam properties and appears somewhat to decrease foam strength. An optimum appears to be from about .25% to about .5% by weight, especially when employing the preferred wetting agents.

The surfactant or wetting agent may in practice be added either to the glycol or polyol or prepolymer component, or to the isocyanate component without apparent difference in result. If the surfactant is mixed with the prepolymer, however, it may be advisable to prepare the foam as soon as possible after the surfactant is mixed into the prepolymer, especially if there is a possibility of a reaction between the ingredients.

(e) *The blowing solvent:* The blowing solvent should be one which is inert to all but soluble or dispersible in at least one of the reactants and insoluble in the final polyurethane foam. The higher the solubility in the reactant or reactants, the lower may be the boiling point of the solvent, which in any case should have a boiling point at one atmosphere of pressure not lower than about —22° F. nor higher than about +210° F., preferably not higher than about +120° F., so that it will be vaporized during the polymerization reaction. In general the halogenated alkane, as well as any other solvent employed either in addition thereto or in place thereof, should be readily liquefied and of sufficient solubility in the reactant or reactants so that its vapor pressure is considerably reduced to avoid the necessity of utilizing expensive high pressure apparatus. If the gas is relatively insoluble, it should be of such a nature so as to be readily dispersible. Foam expansion will occur when the gas is released by attainment of a temperature sufficiently above its boiling point, and this can of course be controlled considerably by removal or nonremoval of the exothermic heat. In cases where the heat of reaction is not sufficient to vaporize the solvent employed, external heating will be required.

The halogenated alkanes possess all of the necessary characteristics and are particularly well adapted to be used as blowing solvents with facility. Fluorotrichloromethane, having a boiling point of about 75° F., has been found especially suitable as the blowing solvent, and has the advantage, as do many of the halogenated alkanes of the "Freon" or "Genetron" type, of solubility in or compatibility with the glycol or polyol or prepolymer or in the isocyanate component. Representative blowing solvents, including the preferred halogenated alkane solvents, and their boiling points at one atmosphere of pressure are shown in the following Table I.

TABLE I.—REPRESENTATIVE BLOWING SOLVENTS

| Formula | Name or trade name | Mol weight | B.P., °F. |
|---|---|---|---|
| $CCl_2F_2$ | Freon [1] 12 | 120.9 | −21.6 |
| $CH_3$—$CHF_2$ | 1,1-difluoroethane | 66.1 | −11.2 |
| $C_4F_8$(cyclic) | Freon C-318 | 200 | 21.1 |
| $CClF_2$—$CClF_2$ | Freon 114 | 170.9 | 38.4 |
| $CHCl_2F$ | Freon 21 | 102.9 | 48.1 |
| $CCl_3F$ | Freon 11 | 137.4 | 74.8 |
| $CBrF_2$—$CBrF_2$ | Freon 114B2 | 259.9 | 117.5 |
| $CCl_2F$—$CClF_2$ | Freon 113 | 187.4 | 117.6 |
| $CH_2Cl_2$ | Methylene chloride | 83 | 104 |
| $CCl_4$ | Carbon tetrachloride | 153 | 168 |
| | Isobutane | 58 | 14 |
| | Butane | 58 | 32 |
| | n-Pentane | 72 | 97 |
| | Isopentane | 72 | 82 |
| | Neopentane | 72 | 48 |
| | n-Hexane | 86 | 156 |
| | 2,2-dimethylbutane | 86 | 120 |
| | Heptanes | 100 | [2] |

[1] Also corresponding "Genertons."  [2] From 174.2 to 209.

It is obvious that blends of such gases, for example a blend of soluble and relatively insoluble gases, may also be combined as the blowing solvent. Blends of the halogenated alkanes with other compatible solvents or gases, such as carbon dioxide, methane, ethane, propane, butanes, pentanes, hexanes, heptanes, propylene, nitrogen, or the like may also be used, by dissolving or dispersing these solvents or gases in the reactant or reactants along with the halogenated alkane. The nonhalogenated alkane solvents or gases may be present alone, but preferably are used in amounts up to about 75% of the solvent mixture. In general and for best foam properties, especially insulating properties, they should not constitute more than 25% of the solvent mixture, the remainder being the halogenated alkane or alkanes.

In practice, the liquefied halogenated alkane and/or other solvent are admixed with the selected reactant or reaction component prior to spray mixing with the other reactants or reaction component. Amounts of blowing solvent, e.g., halogenated alkane, between four and 100 percent by weight of prepolymer have been employed. Based on total weight of reactants, 6.5% of halogenated alkane blowing solvent has been productive of a foam of about four pounds/cubic foot density. Still lower percentages of solvent have been productive of even higher density foams. Three percent of halogenated alkane solvent produces a foam of about ten pounds/cubic foot density. The outer limits of blowing solvent appear to be from about three to about fifty percent, preferably five to about 25 percent, based on total weight of reactants and, by varying the amount of solvent together with other minor variations in formulation, foams having densities of from one to ten pounds or more per cubic foot may be produced, although it should be noted that foams below about 1.2 pounds per cubic foot density have a tedency to shrink when surface skin is cut off of the body of the foam.

(f) The catalyst: As mentioned hereinabove the catalyst employed in accordance with the present invention is a highly active catalyst which causes substantially immediate foaming of the reaction mixture as it impinges upon the surface being treated. In fact, it is not unusual for the foaming reaction to be already started when the ingredients reach the surface being treated. The catalysts which can be used in the present invention are selected from the group consisting of triethylene diamine, dibutyltin diacetate, dibutyltin dilaurate, dibutyltin di-2-ethyl-hexoate, stannous octoate, stannous oleate or stannous 2-ethyl-hexoate, and mixtures of the foregoing. Other catalysts of comparable or greater activity may also be employed. In general, when mixtures of the foregoing catalysts are employed the ratios can be varied within the complete range of proportions. The preferred catalysts of the present invention include triethylene diamine, dibutyltin diacetate, and mixtures of triethylene diamine and dibutyltin diacetate, preferably in a weight ratio of from 3 parts of triethylene diamine to 2 parts of dibutyltin diacetate.

The quantity of catalyst employed is generally dependent upon its activity and/or the temperature of the reactants prior to mixing or spraying. Obviously, more reactive catalysts or higher reactant temperatures require smaller amounts of catalyst. In general, quantities between about 0.1 and 2.0 weight percent of catalyst based on total of all ingredients can be used, preferably between about 0.3 and 0.6 weight percent. The catalysts used in the present invention are commercially available materials, triethylene diamine being available under the trade name Dabco from Houdry Process Company, and the others from such companies as Metal & Thermit Company and Union Carbide Chemical Company. The catalysts as commercially obtained are substantially anhydrous, stable materials. If desired, however, additional water may be removed by conventional procedures, as by vacuum stripping. In view of the small quantity of catalyst employed, however, its water content is generally inconsequential. No deleterious effect upon the foams of the present invention due to the catalysts has been observed, although a slight coloration and viscosity increase on standing of a prepared mixture containing the catalyst and ingredients (b), (d), and (e) have been noted. This coloration and viscosity increase can be substantially inhibited, if desirable, by the inclusion of a small amount, viz. 0.1 to about 2.0 weight percent basis weight of mixture ingredients, of an antioxidant or stabilizer such as tertiary butyl phenol, 4,4'-thiobis-(6-tertiary-butyl-m-cresol), 2,6-ditertiary butyl-4-methyl-phenol, or commercially available organic barium-cadmium complexes, especially those available under the trade name Mervan A from R. T. Vanderbilt Company. In general, however, catalyst stabilizers are not necessary unless the catalyst and ingredients (b), (d) and (e) are to be stored for periods of more than one week.

As mentioned hereinabove, the reactant ratios and ranges have been found to be important and in fact critical in obtaining the high grade rigid foams according to the present invention.

(1) The NCO/OH equivalent ratio of the total reactants should be maintained between about 0.8/1 and 1.2/1, preferably between 0.95/1 and 1.05/1. As the NCO/OH ratio decreases, an increase in tendency toward softness (diminished compressive strength) and shrinkage is observed. This of course accompanied by a somewhat lower cost. At the other end of the ratio of NCO/OH, the cost is somewhat higher, and the tendency toward diminution of the compressive strength and stability is observed, together with a tendency toward larger cells.

(2) The ratio of respective equivalents of the tetra-(hydroxyalkyl)alkylene diamine (b) to the glycol or polyol (a) should be maintained between about 0.75/1 and 6.0/1. When this relationship is not observed, the foam characteristics vary undesirably in the same manner indicated above under (1). Outside the prescribed limits, the foam is either too soft or low in compressive strength to be of practical value or it is characterized by extremely large and uneven cells along with decreased strength and stability properties.

(3) The average equivalent weight of the glycol or polyol (a) and the tetra(hydroxyalkyl)alkylene diamine (b) should be between about 80 and 130, preferably between 90 and 110. When operating within this range, rigid polyurethane foam of excellent properties can be prepared. At lower average equivalent weights foams tend to become friable and brittle and less economical because of the additional polyisocyanate required for stoichiometric balance, while at higher average equivalent weights the foams are more subject to heat distortion, tend to shrink, have lower strength properties, and have a higher percentage of open cells. The average equivalent weight ranges of reactants (a) and (b) are therefore obviously significant in producing a high grade rigid polyurethane foam of excellent strength and stability characteristics according to the present invention.

It should be noted that, according to conventional practice in the art, various fillers and flame retardants, and the like, such as carbon black, magnesium carbonate, calcium carbonate, ammonium phosphate, tris β-chloroethyl phosphate, etc. may be incorporated into the foams of the present invention if desired. These materials are, however, usually productive of a higher open cell content and diminution of strength characteristics of the foam embodying the same. So it is to be understood that while a particular foam application may require such additaments and while the foam so constituted may retain much of its superior quality, for greater strength, closed cell content, and stability, the incorporation of such materials is not generally recommended. It will also be appreciated that when circumstances make desirable the inclusion of fillers and flame retardants, great care should be taken to insure the proper dispersion of these ingredients in the foam forming reactant mixtures in order to avoid clogging of lines and spray nozzles.

As mentioned hereinabove, the preferred procedure for forming the foams of the present invention is to prereact the polyol ingredient (a) with the polyisocyanate (c) to form a liquid, substantially anhydrous relatively stable prepolymer prior to being sprayed together with the other reactants on the surface being treated. In the preparation of such prepolymer or semi-prepolymer according to conventional procedure, an excess of polyisocyanate (c) over the stoichiometric amount necessary to react with the polyol (a) is usually employed. Less may be employed, but then the remaining amount of isocyanate necessary to attain the required equivalent ratio will have to be added later to the foaming reaction. Alternatively, the polyol (a) can be added in more than one portion to the prepolymer reaction. This has the advantage over one-step processing of about 10° C. to 15° C. lower exotherm. In making the prepolymer the reactants may be heated together with agitation at a temperature of from about 50° C. to about 130° C., preferably 70° C. to 100° C., for a period sufficient to react most if not all of the hydroxyl groups in the reaction, viz., 1 to 2 hours, whereafter the prepolymer is allowed to stand in the free NCO content determined. The free NCO content of the polymer may range between about 15 and 48 percent, preferably between about 24 and 31 percent, and still more preferably about 25 percent.

The usual pH's are employed during the preparation of the prepolymer. Bases and acids accelerate the reaction, and preferably it is maintained substantially neutral and neither are added.

The viscosity of the prepolymer may vary greatly at the time of its preparation. In using commercially available spraying equipment, however, it is preferred that the viscosity of the prepolymer at 25° C. not exceed about 6000 centipoises. The viscosity of the prepolymer at the time of actual spraying may be controlled in several ways, for example, by heating, by adjustment of the free NCO content, and by thinning with a small amount of solvent, for example, the halogenated alkane used as a blowing agent.

In a preferred embodiment of the present invention a prepolymer is prepared by mixing together 70 parts by weight of tolylene diisocyanate consisting of an 80/20 mixture of 2,4/2,6 isomers and 30 parts of a polymeric polyol (TP-440) which is a polyoxypropylene derivative of trimethylolpropane prepared by the addition of propylene oxide thereto, having an approximate molecular weight of 400 to 450, averaging about 418 and an average hydroxyl number of 409, and allowing the materials to react with continuous stirring until the exothermic heat of reaction raises the temperature to about 100° C. This elevated temperature is maintained by cooling or heating for one hour after which the reaction mixture is cooled to about 50° C. and transferred to storage in clean, dry containers. After about 24 hours of aging the prepolymer so prepared will have a viscosity at 25° C. of about 3500 centipoises and a free NCO content of about 25 percent.

In the practice of the present invention various types of apparatus can be used. It is, however, one of the principal advantages of the present invention that simple, commercially available apparatus can be employed. The type of apparatus employed, however, does not constitute a part of the present invention and should not be considered as a limiting feature thereof. While I have found that controlling the nature and proportions of the reactant materials permits the use of simple pressure spray equipment, positively driven proportioning pumps can also be employed, and may be desirable if the viscosity of the ingredients reaches proportions adversely affecting the operation of more simplified equipment. The method and product of the present invention can be used in job operations as, for example, coating of parts of buildings, lining the inside or coating the outside of tanks, valves, pipes, and the like, or it may be used to coat a continuous succession of articles or a strip article upon a moving conveyor. Surface pretreatment is generally not required although it is desirable to remove oily or waxy films and loose particles such as dirt and scale prior to spraying.

Illustrative embodiments of apparatus adapted for use in applying foams to various articles and the composite articles so formed are diagrammatically illustrated in the drawings in which:

FIGURE 1 is a flow diagram of a system for mixing and applying the foam-forming ingredients on a surface to be treated;

FIGURE 2 illustrates partly in section one type of spray apparatus which may be used in applying the ingredients as two separate streams mixing and impinging on the inside of a steel tank to be lined with foam for combined surface protection and insulation purposes;

FIGURE 3 illustrates in section a composite article comprised of a metal base member and a coating of foam;

FIGURE 4 illustrates in section a composite article showing a glass base member and a layer of foam;

FIGURE 5 illustrates in section a composite article comprising a wood base member and a layer of foam;

FIGURE 6 illustrates in section a composite article comprising a base member consisting of cement board having a layer of foam; and FIGURE 7 illustrates in section a section of a steel tank having an outer layer of foam for protection against atmospheric corrosion and insulation purposes.

Referring to FIG. 1 of the drawing, there is illustrated a general system for use in spraying the foam-forming ingredients to form the composite articles illustrated in the other figures of the drawing. In this embodiment of apparatus, a prepolymer as hereinbefore described and a mixture of the other foam-forming ingredients are contained, respectively, in pressure pots 10 and 11. These pots are of conventional design and are closed so that a gaseous medium such as air, $CO_2$, nitrogen, or the like, can be confined under pressure above the liquids in the pots. Gauges 12 and 13 can be used to indicate pressures prevailing in pots 10 and 11, respectively. A gaseous medium, such as air, is supplied to pots 10 and 11 via lines 14 and 15, respectively, having constant pressure outlet valves 16 and 17, respectively, disposed therein. Lines 14 and 15 are connected to a supply line 20 leading to a supply of air 21 under pressure which is in turn connected via line 22 to compressor 23. Outlet lines 24 and 25 from pressure pots 10 and 11, respectively, connect with heat exchangers 26 and 27.

Alternatively, outlet lines 24 and 25 may connect with variable delivery pumps, not shown, which may be driven in a synchronized manner to meter the correct proportions of prepolymer and other ingredients. Such synchronized variable delivery metering pumps can also be connected with means for automatically stopping and starting the spraying operation responsive to signals from the spray gun controls. However, I have found that by controlling the viscosity of the foam-forming ingredients not to exceed about 6000 centipoises at 25° C. the need for positive displacement metering pumps can be dispensed with and simple pressure pots, properly controlled, can be employed.

I have found that in addition to controlling of the viscosity of the ingredients by the proper preparation of prepolymer and selecting the proper reactant ratios, it is also possible to control the viscosity by heating means. It may also be desirable to heat the reactants for other reasons, such as, to attain a desirable speed of reaction and foaming, to raise the temperature of the blowing solvent, to cut down on the amount of catalyst employed, or to maintain an even temperature not affected by ambient conditions. Thus, outlet lines 24 and 25 connect with heat exchangers 26 and 27 respectively which are fed hot water, or some other desirable heat exchange medium, via lines 30 and 31, respectively. Heat exchangers 26 and 27 may also be provided with outlets 32 and 33 from which the heat exchange medium may be collected and raised to an appropriate temperature prior to recirculation. If desired, or if the ambient temperature of the other reactants present in pressure pot 11 is adequate, viz., about 65 to 80° F., heat exchanger 27 may be dispensed with. It may, however, be desirable to cool the other reactants, for example, when an exceptionally volatile blowing solvent is employed, in which case heat exchanger 27 can be used for cooling purposes. In a preferred operation of the method of the present invention the temperature of the prepolymer as it leaves heat exchanger 26 is between about 120 and 130° F. and the temperature of the other reactants leaving heat exchanger 27 is about 75° F.

Outlet lines 34 and 35, which are generally flexible, from heat exchangers 26 and 27, respectively, connect with nozzles 36 and 37, respectively, of spray gun 40. In order to maintain the temperature of the prepolymer and other reactants at the proper level until they reach spray gun 40 and are sprayed it is desirable to trace lines 34 and 35 with small flexible conduits 41 and 42 connecting with the source of heat exchange medium to heat exchangers 27 and 26 respectively. Conduits 41 and 42 tracing lines 35 and 34, respectively, can be attached over a suitable length thereof by means of jackets 43 and 44 or other suitable insulating means. Conduits 41 and 42 discharge to suitable collecting, heating and/or cooling, and recycle means not shown.

The gaseous medium under pressure used to supply pressure pots 10 and 11 can also be supplied to the spray gun 40 through a tube or hose 45 having a constant pressure outlet valve 46 disposed therein and being further connected to line 20, thus supplying the gaseous medium under pressure to the spray gun in order to break up the prepolymer and the other foam-forming reactants or ingredients into relatively fine sprays which, as they strike the article to be coated, are thoroughly intermixed, thus promoting uniform foaming and adherence of the foam to the surface.

Referring to FIG. 2 of the drawing, an article, such as the inside of a steel tank 50, is shown as being provided with a foam layer of rigid polyether-based polyurethane foam 51. The apparatus or spray gun 40 employed in the operation is shown as comprising a pair of slightly convergent nozzles 36 and 37 which may be of conventional design and arranged to deposit the material being sprayed in an appropriate pattern. Nozzles 36 and 37 may be provided with valves 52 and 53, respectively, for regulating and metering the flow of air through the tubes supplying these nozzles. As mentioned, spray gun 40 can be of conventional design. I have found a very suitable spray gun useful in practicing the method of the present invention is available commercially from the De Vilbiss Company, Toledo, Ohio, sold under the catalog code designation P–JGC–505. Other spray guns of conventional design, of internal or external mixing type, but preferably those in which the ingredients are mixed externally after spraying rather than internally prior to spraying, available from other manufacturers, can be used.

It will be observed from FIG. 2 of the drawing that spray nozzles 36 and 37 are disposed in slightly convergent relationship so that insofar as practicable the sprays converge at a proper distance thus tending to intermix the droplets very thoroughly and substantially as they strike the surface being treated, namely, steel tank 50. However, complete intermixing of the sprays while they are in transit to the surface is not absolutely essential since adequate mixing of the droplets from the two nozzles may be obtained by reciprocating the sprays across the surface in such a manner that thorough overlapping is obtained. It will be recognized that the sprays comprising minute droplets from the two nozzles, as they strike with considerable force upon the surface undergoing treatment, are intimately and uniformly dispersed in each other so that highly uniform foaming can take place without any undue tendency of the foamable mixture to overheat locally.

In general, the normal atmospheric temperature, especially when accompanied by the exothermic temperature rise characterizing the polymerization reaction between the prepolymer and other reactants, is adequate to cure the resulting foam within a reasonable time. If desired, however, the curing rate of the finished foam can be accelerated by the application of heat, such as radiant heat, to the surface treated.

Referring to FIGS. 3 through 7 of the drawings, there are illustrated in section specific embodiments of composite articles prepared in accordance with the method of the present invention and embodying the improved rigid polyether-based polyurethane foams thereof. In FIG. 7 there is illustrated a sectional view of a steel tank having an outer coating of foam, said steel tank having an obvious nonplanar surface. It will be appreciated that said steel tank may be lined from the inside to provide concomitant surface protection and insulation thereof. It has been found that tanks, tank cars, and the like so treated are useful for the storage and/or shipment of hot 50% caustic. This is believed to be made possible by the very high degree of chemical resistivity of the foams of the present invention which is, in turn, believed to be caused by the absence or substantial absence of urea groups in the finished foam. Further, since the foam is made from polyether polyols rather than polyester materials which are known to be generally susceptible to caustic hydrolysis, this resistance to hot caustic is possible.

The evaluation of the rigid polyether-based polyurethane foams of the invention and foams contrasted therewith, as indicated in the following examples, was in accordance with standard testing procedure, and more specifically as set out below.

TEST METHODS FOR EVALUATION OF
RIGID FOAMS (1) Compressive strength at yield point—Compression rate, one-half inch per minute.
  Specimens—1 inch diameter x 1 inch high.
  Standard: ASTM D695–54 with modifications in machine speed and specimen size as indicated. Yield point described in ASTM 638–52T.
(2) Water absorption—Specimens immersed in water under an 8 foot head for 48 hours at room temperature.
  Specimens—2 inches x 2 inches x 1 inch. Similar to method of Federal Specification Mil–B–17426 (Bureau of Ships).
(3) Percent closed cells—Air displacement method.
  Specimens—1 inch diameter, 1 inch high.

In this method, the percent given is of closed cells to total cells, including those opened by cutting, which are considered open cells. Theoretically, therefore, 100% is impossible, and best attainable percentages are 90–95.

A measurement of air displacement volume divided by outside measurement volume gives the percentage of closed cells.

(4) Humid aging—Samples exposed to 100% relative humidity at 70° C. for 1 month.
   Compressive strength measured before and after aging.
   Period can be extended for comparative purposes.
   Specimens—4 inches x 4 inches x 1 inch.
(5) Heat distortion—Samples were tested at 120° C. by allowing a 100-gram load to press on a circular foot 1 square inch in area for 24 hours.
   Specimens—3 inches x 3 inches x 1 inch.
(6) "K" factor (thermal conductivity)—Measured by the "Guarded Hot Plate Method," ASTM C-177.

The following examples are given by way of illustration only and are not to be construed as limiting. In these examples foams were prepared using a mechanical system substantially as shown in FIG. 1 of the drawing with the exception that heat exchanger 27 for heating component II was eliminated. The pressure pots had capacities of from 2 to 10 gallons, the spray gun employed was a De Vilbiss type P-JGC-505, the spray gun discharge temperature of component I ranged between 120° F. and 130° F. and for component II between about 70° F. and 80° F. The pressure on each of the supply tanks or pressure pots was adjusted to supply components I and II to the spray gun in the desired proportions. The atomizing air was supplied to the spray gun at about 70 p.s.i.g. and the rate of discharge from the gun varied between about 1.5 and 4 pounds per minute.

*Example 1*

A prepolymer was prepared by mixing together in a clean dry glass lined reactor 70 parts by weight of tolylene diisocyanate (c) consisting of an 80/20 mixture of 2,4/2,6 isomers and 30 parts by weight of a polymeric polyol (a) which is a polyoxypropylene derivative of trimethylolpropane prepared by the addition of propylene oxide thereto, having an approximate molecular weight of 400 to 450, averaging about 418 and having an average hydroxyl number of 409. Said polymeric polyol is available commercially under the trade name Pluracol TP-440. The materials were continuously stirred and allowed to react until the exothermic heat of reaction raised the temperature to about 100° C. This elevated temperature was maintained by heating or cooling for about one hour after which the reaction mixture was cooled to about 50° C. and transferred to storage in clean dry containers. After 24 hours of aging the prepolymer so prepared had a viscosity at 25° C. of 4000±1000 centipoises and a free NCO content of 25±0.4%. It was liquid, substantially anhydrous and relatively stable in character.

Component I was prepared by mixing together 0.5 part by weight of a water soluble liquid silicone surfactant X-520 (d) (marketed by Silicone Division, Union Carbide Company) with 100 parts of the above produced prepolymer.

Component II was prepared by mixing 44 parts by weight of N,N,N',N'-tetrakis(2-hydroxypropyl)ethylene diamine (b), 20 parts of trichlorofluoromethane (e), 0.6 part of triethylene diamine (f) and 0.25 part of an antioxidant stabilizer consisting of an organic barium-cadmium complex sold under the trade name Mervan A.

In the spraying and foaming step components I and II were mixed in a proportion of 100.5 parts by weight of I per 64.85 parts of II (I/II=1.56/1) providing an overall NCO/OH equivalent ratio of 1/1, an equivalents ratio of N,N,N',N'-tetrakis(2-hydroxypropyl)ethylene diamine (b) to polyol (a) [(b)/(a)] of 2.8/1, and a combined equivalent weight of (a) and (b) of 90.5. As the sprays mixed and impinged on the surfaces being treated, substantially immediate foaming and adherence of the foam to the surface took place.

The foam was sprayed onto a vertical cement board wall until a thickness of 6 to 7 inches was attained. No sagging, running, dripping or shrinking was observed. Similar results were obtained when the foam was sprayed from below onto an overhead steel surface. The foam was also sprayed onto vertically disposed base member surfaces consisting of cement, paper board, aluminum, copper, wood, glass, and cold rolled steel, each with similar results. The adhesion to the base member surface during and shortly after spraying in each case was sufficient to prevent sagging or removal of the foam under its own weight. Further, after curing for 24 hours it was almost impossible to separate the foam from the base member without destroying the foam.

The above foam was also successfully sprayed on the inside of a 10,000 gallon tank car for shipping 50% aqueous sodium hydroxide as a protective coating and for insulation; on the outside of a brine concentrating tank to prevent "sweating" and corrosion; and on the outside end of a liquid chlorine storage tank to maintain the inside tank temperature at about −35° C.

The properties of typical core samples of foam from the above composite articles are as follows.

Density, lbs./cu. ft. _____ 2.42.
Compressive strength, p.s.i.
   at yield point _____ 53.0.
Closed cells, percent _____ 84.2.
Water absorption, lbs./cu. ft. ___ 2.3.
K factor, B.t.u./hr./sq. ft./° F.
   per inch thickness _____ 0.125.
Dimensional stability:
   At room temperature _____ Excellent.
   70° C., 100% R.H. _____ No change—1 mo.
   −25° C. _____ Neg. change—1 mo.
Caustic resistance _____ No apparent change when exposed 30 days at 150° F. to 50% aqueous NaOH.

*Example 2*

In this example component I was prepared in the same manner, from the same materials and in the same proportions as in Example 1. Component II was prepared by mixing together 44 parts by weight of N,N,N',N'-tetrakis(2-hydroxypropyl)ethylene diamine (b), 20 parts of trichlorofluoromethane (e) and 0.2 part of dibutyltin diacetate (f). Components I and II were spray-mixed in different proportions onto a vertically disposed paper board surface. Substantially immediate foaming took place with no noticeable dripping, sagging, running or shrinking. The pertinent information concerning proportions and properties is set forth as follows:

| | 1 | 2 | 3 |
|---|---|---|---|
| Weight ratio of I/II | 1.73/1 | 1.57/1 | 1.42/1 |
| NCO/OH | 1.1/1 | 1/1 | 0.9/1 |
| Ratio of equivalents (b)/(a) | 2.53/1 | 2.8/1 | 3.1/1 |
| Combined equivalents (b) and (a) | 89.5 | 90.5 | 92.0 |
| Density, lbs./cu. ft. | 2.68 | 2.40 | 2.16 |
| Comp. str. at yield point, p.s.i. | 49.7 | 41.0 | 35.6 |
| Closed cells, percent | 84.1 | 84.1 | 84.3 |
| Water absorption, lbs./cu. ft. | 2.6 | 2.4 | 2.5 |
| K factor, B.t.u./hr./sq. ft./°F. per inch thickness | .152 | .140 | .142 |
| Dimensional stability: | | | |
| Room temp. | (1) | (1) | (1) |
| 70° C., 100% R.H. | (2) | (2) | (2) |
| −25° C. | (3) | (3) | (3) |

[1] Excellent.
[2] Negligible change in strength properties in one month.
[3] No visible shrinkage in one month.

Example 3

In this example component I was identical to that employed in Examples 1 and 2. Component II was prepared by mixing together 44 parts by weight of N,N,N',N'-tetrakis(2-hydroxypropyl)ethylene diamine ($b$), 20 parts of trichlorofluoromethane ($e$) and different catalysts ($f$) in different proportions, as presented hereinbelow. Foams were prepared in the manner of Example 2 containing the following catalysts and proportions and having the properties indicated. Substantially immediate foaming took place with no noticeable dripping, sagging, running or shrinking.

|  | Catalyst(s) | | | |
| --- | --- | --- | --- | --- |
|  | Dibutyltin diacetate | | | Dibutyltin diacetate and triethylene diamine |
| Parts by weight | 0.2 | 0.35 | 0.5 | 0.2 and 0.3 |
| Weight ratio I/II | 1.56/1 | 1.56/1 | 1.56/1 | 1.56/1 |
| NCO/OH | 1/1 | 1/1 | 1/1 | 1/1 |
| Equivalents ratio ($b$)/($a$) | 2.8/1 | 2.8/1 | 2.8/1 | 2.8/1 |
| Combined equivalents ($a$) and ($b$) | 90.5 | 90.5 | 90.5 | 90.5 |
| Density, lbs./cu. ft. | 2.40 | 2.68 | 3.0 | 2.54 |
| Comp. str. at yield point, p.s.i. | 41.0 | 35.6 | 51.5 | 44.4 |
| Closed cells, percent | 84.1 | 81.7 | 80.9 | 84.8 |
| K factor, B.t.u./hr./sq. ft./° F. per inch thickness | .140 | .135 | .140 | ---------- |
| Dimensional stability: |  |  |  |  |
| Room temp | (1) | (1) | (1) | (1) |
| 70°C., 100% R.H. | (2) | (2) | (2) | (2) |
| −25°C | (2) | (2) | (2) | (2) |

[1] Excellent.  [2] No change after 1 month.

Example 4

In this example component I was identical to that employed in the preceding examples. Component II was prepared by mixing together 44 parts by weight of N,N,N',N'-tetrakis(2-hydroxypropyl)ethylene diamine ($b$), varying amounts of triethylene diamine ($f$) and varying amounts of trichlorofluoromethane ($e$). Foams were prepared in the manner of Example 2 having the proportions and properties indicated below. Substantially immediate foaming occurred with no noticeable dripping, sagging, running or shrinking.

| Parts of triethylene diamine | 0.2 | 0.6 | 0.8 |
| --- | --- | --- | --- |
| Parts trichlorofluoromethane | 10 | 25 | 30 |
| Percent trichlorofluoromethane | 6.5 | 14.8 | 17.2 |
| Weight ratio I/II | 1.85/1 | 1.44/1 | 1.35/1 |
| NCO/OH | 1/1 | 1/1 | 1/1 |
| Equivalents ratio ($b$)/($a$) | 2.8/1 | 2.8/1 | 2.8/1 |
| Combined equivalents ($b$) and ($a$) | 90.5 | 90.5 | 90.5 |
| Density, lbs./cu. ft. | 4.1 | 1.9 | 1.75 |
| Comp. str. at yield point, p.s.i. | 74.2 | 39.1 | 31.3 |
| Closed cells, percent | 85.0 | 82.9 | 82.0 |
| Water absorption, lbs./cu. ft. | 2.1 | 2.5 | 2.7 |
| K factor, B.t.u./hr./sq. ft./° F. per inch thickness | .140 | .139 | .145 |
| Dimensional stability: |  |  |  |
| Room temp | (1) | (1) | (1) |
| 70 °C., 100% R.H. | (2) | (2) | (3) |
| −25 °C | (2) | (2) | (4) |

[1] Excellent.  [2] No change 1 month.  [3] Slight swelling 1 month  [4] Slight shrinkage 1 month.

Example 5

Component I in this example was identical to that employed in the preceding examples. Component II was prepared by mixing together 44 parts by weight of N,N,N',N'-tetrakis(2-hydroxypropyl)ethylene diamine ($b$), 0.6 part of triethylene diamine ($f$), and 25 parts of trichlorotrifluoroethane ($e$). Foams were prepared in the manner of Example 2 having the proportions and properties indicated below. Foaming took place substantially immediately with no noticeable dripping, running, sagging or shrinking.

Weight ratio, I/II _____ 1.44/1.
NCO/OH _____ 1/1.
Equivalents ratio, ($b$)/($a$) ____ 2.8/1.
Combined equivalents ($b$) and ($a$) _____ 90.5.
Density, lbs./cu. ft _____ 2,48.
Comp. str. at yield, p.s.i. _____ 50.3.
Closed cells, percent _____ 84.1.
Water absorption, lbs./cu. ft. ___ 2.33.
Dimensional stability:
    Room temp _____ Excellent.
    70° C., 100% R.H. _____ Negligible change 1 mo.
    −25° C _____ Negligible change 1 mo.

Example 6

In this example component I was identical to that employed in the preceding examples. Component II was prepared by mixing together 44 parts by weight of N,N,N',N'-tetrakis(2-hydroxypropyl)ethylene diamine ($b$), various amounts of trichlorofluoromethane ($e$), 0.6 part of triethylene diamine ($f$) and various amounts of tris β-chloroethyl phosphate which is a flame retardant. Foams were prepared in the manner of Example 2 having the proportions and properties indicated below. Almost immediate foaming occurred on the surface with no noticeable dripping, running, sagging or shrinking.

| Parts tris β-chloroethyl phosphate | 15 | 20 |
| --- | --- | --- |
| Percent tris β-chloroethyl phosphate | 8.1 | 10.5 |
| Parts trichlorofluoromethane | 25 | 26 |
| Percent trichlorofluoromethane | 13.5 | 13.5 |
| Weight ratio of I/II | 1.19/1 | 1.11/1 |
| NCO/OH | 1/1 | 1/1 |
| Equivalents ratio ($b$)/($a$) | 2.8/1 | 2.8/1 |
| Combined equivalent weight of ($b$) and ($a$) | 90.5 | 90.5 |
| Density, lbs./cu. ft. | 2.05 | 2.25 |
| Compressive strength at yield point, p.s.i. | 25.5 | 29.2 |
| Closed cells, percent | 83.5 | 81.9 |
| Water absorption, lbs./cu. ft. | 2.8 | 3.0 |
| K factor, B.t.u./hr./sq. ft./° F. per inch thickness | .135 | .142 |
| Dimensional stability: |  |  |
| Room temp | (1) | (1) |
| 70°C., 100 percent R.H. | (2) | (2) |
| −25°C | (3) | (3) |
| Flame retardance ASTM D-635-56T | (4) | (5) |

[1] Good.  [2] Slight swelling 1 month.  [3] Slight shrinkage 1 month.  [4] Burns slowly.  [5] Self extinguishing.

Example 7

Component I in this example was identical to that employed in the preceding examples. Component II was prepared by mixing together 39 parts by weight of N,N,N',N'-tetrakis(2-hydroxypropyl)ethylene diamine ($b$), 10 parts of a polymeric polyol which is a polyoxypropylene derivative of trimethylolpropane prepared by the addition of propylene oxide thereto having an approximate molecular weight of 400 to 450 averaging about 418 and having an average hydroxyl number of 409 ($a$), 0.35 part of dibutyltin diacetate ($f$), and 25 parts of trichlorofluoromethane ($e$). Foams were prepared in the manner of Example 2 having the proportions and properties indicated below. Foaming on the surface took place immediately with no observable running, dripping, sagging or shrinking.

Weight ratio of I/II _____ 1.35/1.
NCO/OH _____ 1/1.
Equivalents ratio ($b$)/($a$) _____ 1.85/1.
Combined equivalent weight ($a$) and ($b$) _____ 96.0.
Density, lbs./cu. ft _____ 3.3.
Comp. str. at yield, p.s.i. _____ 43.3.
Closed cells, percent _____ 82.3.
K factor, B.t.u./hr./sq. ft./° F. per inch thickness _____ .147.
Water absorption, lbs./cu. ft. ___ 2.2.
Dimensional stability:
    Room temp _____ Excellent.

70° C., 100% R.H._____ Excellent and slight improvement in properties, 1 month.
−25° C._____ No change, 1 month.

*Example 8*

Component I of this example is identical to that employed in the preceding examples with the exception that the water soluble silicone wetting agent (d) was included in component II. Component II was prepared by mixing together 44 parts by weight of N,N,N′,N′-tetrakis(2-hydroxypropyl)ethylene diamine (b), 0.5 part of water soluble silicone surfactant X–520 used in Example 1 (d), 20 parts of trichlorofluoromethane (e), and 0.6 part of triethylene diamine (f). Foams were prepared in the manner of Example 2 having the proportions and properties indicated below. Foaming on the paper board surface began immediately on contact with no noticeable dripping, running, shrinking or sagging.

Weight ratio, I/II_____ 1.57/1.
NCO/OH_____ 1/1.
Equivalents ratio, (b)/(a)_____ 2.8/1.
Combined equivalent weight, (b) and (a)__ 90.5.
Density, lbs./cu. ft_____ 2.8.
Comp. str. at yield, p.s.i._____ 57.7.
Closed cells, percent _____ 82.7.
Water absorption_____ 3.2.
Dimensional stability:
　Room temp_____ Excellent.
　70° C., 100% R.H._____ Neg. change 1 month.
　−25° C._____ Neg. change 1 month.

*Example 9*

In this example foams are prepared in the manner of Example 2 using as component I the same material as employed in Examples 1 through 6. Component II is prepared by mixing together 44 parts by weight of N,N,N′,N′-tetrakis(2-hydroxypropyl)ethylene diamine (b), 20 parts of trichlorofluoromethane (e), and 0.5 part of different catalysts (f). The foams so prepared will have the following proportions and properties.

| | Catalyst | | | |
|---|---|---|---|---|
| | Dibutyltin dilaurate | Dibutyltin di-2-ethylhexoate | Stannous octoate | Stannous oleate |
| Weight ratio I/II | 1.55/1 | 1.55/1 | 1.55/1 | 1.55/1 |
| Equivalents ratio, (b)/(a) | 2.8/1 | 2.8/1 | 2.8/1 | 2.8/1 |
| Combined equivalents weight (b) and (a) | 90.5 | 90.5 | 90.5 | 90.5 |
| Density, lbs./cu. ft. | 2.40 | 2.54 | 2.48 | 2.62 |
| Comp. str. at yield, p.s.i. | 45.8 | 49.0 | 47.5 | 51.2 |
| Closed cells, percent | 83.2 | 84.1 | 84.1 | 83.5 |
| Water absorption, lbs./cu. ft. | 2.6 | 2.3 | 2.4 | 2.8 |
| K factor, B.t.u./hr./sq. ft./° F. per inch thickness | .140 | .145 | .142 | .135 |
| Dimensional stability: | | | | |
| Room temp. | (1) | (1) | (1) | (1) |
| 70° C., 100 percent R.H. | (2) | (2) | (2) | (2) |
| −25° C. | (2) | (2) | (2) | (2) |

[1] Excellent.  [2] Negligible change 1 month.

While this invention has been described and exemplified in terms of its preferred embodiments, those skilled in the art will readily appreciate that modifications and variations in ingredients, conditions, apparatus, and the like can be made without departing from the scope and spirit of the invention.

What is claimed is:
1. A method of coating a solid surface with a stable rigid polyether-based solvent-blown polyurethane foam which comprises spraying:
　(a) a polyoxyalkylene addition product of a polyhydric alcohol having from 2–6 hydroxyl groups inclusive, having a molecular weight between about 270 and 1200 and an equivalent weight between about 90 and 300;
　(b) a tetra(hydroxyalkyl)alkylene diamine having a molecular weight between about 220 and 400 and an equivalent weight between about 55 and 100;
　(c) an organic polyisocyanate;
　(d) a wetting agent;
　(e) a blowing solvent; and
　(f) a catalyst selected from the group consisting of triethylene diamine, dibutyltin diacetate, dibutyltin dilaurate, dibutyltin di-2-ethylhexoate, stannous octoate, stannous oleate, and mixtures of the foregoing;
and impinging the spray, said spray containing a maximum of 0.5% by weight of added water, as an intimate mixture upon a common solid surface whereby substantially immediate foaming and adherence of foam is effected on said common surface, the following further conditions being maintained:
　(g) the over-all NCO/OH equivalent ratio being between about 0.8/1 and 1.2/1;
　(h) the ratio of respective equivalents of said tetra(hydroxyalkyl)alkylene diamine to said polyoxyalkylene addition product of a polyhydric alcohol being between about 0.75/1 and 6/1;
　(i) the average equivalent weight of said polyoxyalkylene addition product of a polyhydric alcohol and said tetra(hydroxyalkyl)alkylene diamine combined being between about 80 and 130; and
　(j) the separation of said tetra(hydroxyalkyl)alkylene diamine and said organic polyisocyanate until commencement of spraying.
2. The method of claim 1 wherein the solid surface is a nonplanar surface.
3. The method of claim 1 wherein the solid surface is metal.
4. The method of claim 1 wherein the solid surface is wood.
5. The method of claim 1 wherein the solid surface is cement.
6. The method of claim 1 wherein the solid surface is glass.
7. A method of coating a solid surface with a stable rigid polyether-based solvent-blown polyurethane foam which comprises spraying:
　(a) a liquid, substantially anhydrous, relatively stable prepolymer which is the reaction product of a polyoxyalkylene addition product of a polyhydric alcohol containing from 2–6 hydroxyl groups, inclusive, having a molecular weight between about 270 and 1200 and an equivalent weight between about 90 and 300 and an organic polyisocyanate;
　(b) a tetra(hydroxyalkyl)alkylene diamine having a molecular weight between about 220 and 400 and an equivalent weight between about 55 and 100;
　(c) a wetting agent;
　(d) a blowing solvent comprisng a halogenated alkane; and
　(e) a catalyst selected from the group consisting of triethylene diamine, dibutyltin diacetate, dibutyltin dilaurate, dibutyltin di - 2 - ethylhexoate, stannous octoate, stannous oleate, and mixtures of the foregoing;
and impinging the spray, said spray containing a maximum of 0.5% by weight of added water, as an intimate mixture upon a common solid surface whereby substantially immediate foaming and adherence of foam is effected on said common solid surface, the following further conditions being maintained:
　(f) the over-all NCO/OH equivalent ratio being between about 0.8/1 and 1.2/1;
　(g) the ratio of respective equivalents of said tetra(hydroxyalkyl)alkylene diamine to said polyoxyalkylene addition product of a polyhydric alcohol being between about 0.75/1 and 6/1;

(h) the average combined equivalent weight of said polyoxyalkylene addition product of a polyhydric alcohol and of said tetra(hydroxyalkyl)alkylene diamine being between about 80 and 130; and (i) the separation of said tetra(hydroxyalkyl)alkylene diamine from said organic polyisocyanate until commencement of spraying.

8. A method of coating a solid surface with a stable rigid polyether-based solvent-blown polyurethane foam which comprises spraying:

(a) a liquid, substantially anhydrous, relatively stable prepolymer of a polyoxyalkylene addition product of a polyhydric alcohol having from 2-6 hydroxyl groups inclusive, having a molecular weight between about 270 and 1200 and an equivalent weight between about 90 and 300 and an organic polyisocyanate;

(b) a tetra(hydroxyalkyl)alkylene diamine having a molecular weight between about 220 and 400 and an equivalent weight between about 55 and 100;

(c) from about 0.05% to 2.0% by weight of total reactants of a wetting agent;

(d) from about 3% to about 50% by weight of total reactants of a blowing solvent comprising a halogenated alkane having a boiling point at atmospheric pressure not lower than about $-22°$ F. nor higher than about 120° F.; and (e) from about 0.1% to 2.0% by weight of total reactants of a catalyst selected from the group consisting of triethylene diamine, dibutyltin diacetate, dibutyltin dilaurate, dibutyltin di-2-ethylhexoate, stannous octoate, stannous oleate, and mixtures of the foregoing;

and impinging the spray, said spray containing a maximum of 0.5% by weight of added water, as an intimate mixture upon a common solid surface and effecting substantially immediate foaming and adherence of foam on said common surface, the following further conditions being maintained:

(f) the over-all NCO/OH equivalent ratio being between about 0.8/1 and 1.2/1;

(g) the ratio of respective equivalents of said tetra(hydroxyalkyl)alkylene diamine to said polyoxyalkylene addition product of a polyhydric alcohol being between about 0.75/1 and 6/1;

(h) the average combined equivalent weight of said polyoxyalkylene addition product of a polyhydric alcohol and of said tetra(hydroxyalkyl)alkylene diamine being between about 80 and 130; and (i) the separation of said tetra(hydroxyalkyl)alkylene diamine from said organic polyisocyanate until commencement of spraying.

9. A method according to claim 8 wherein said prepolymer is a prepolymer reaction product of a polyoxyalkylene addition product of trimethylolpropane and tolylene diisocyanate.

10. A method according to claim 8 wherein said tetra(hydroxyalkyl)alkylene diamine is N,N,N',N'-tetrakis(2-hydroxypropyl)ethylene diamine.

11. A method according to claim 8 wherein said wetting agent is a water-soluble organosilicone surface-active agent.

12. A method according to claim 8 wherein said blowing solvent is trichlorofluoromethane.

13. A method according to claim 8 wherein said catalyst is a mixture of triethylene diamine and dibutyltin diacetate.

References Cited in the file of this patent

UNITED STATES PATENTS

| | | |
|---|---|---|
| 2,779,689 | Reis | Jan. 29, 1957 |
| 2,866,774 | Price | Dec. 20, 1958 |
| 2,915,496 | Swart et al. | Dec. 1, 1959 |
| 3,015,634 | Ferrigno | Jan. 2, 1962 |

FOREIGN PATENTS

| | | |
|---|---|---|
| 1,161,239 | France | Nov. 17, 1958 |
| 821,342 | Great Britain | Oct. 7, 1959 |

OTHER REFERENCES

"Modern Plastics Encyclopedia Issue for 1960" (September 1959) (page 120 relied on).